No. 612,577. Patented Oct. 18, 1898.
E. G. SMITH.
LEVEL.
(Application filed Nov. 12, 1897.)

(No Model.)

WITNESSES:
Charles M. Jones.
W. D. Chase.

Ernst G. Smith, INVENTOR.

BY
G. T. Hackley, his ATTORNEY.

UNITED STATES PATENT OFFICE.

ERNST G. SMITH, OF COLUMBIA, PENNSYLVANIA.

LEVEL.

SPECIFICATION forming part of Letters Patent No. 612,577, dated October 18, 1898.

Application filed November 12, 1897. Serial No. 658,286. (No model.)

*To all whom it may concern:*

Be it known that I, ERNST G. SMITH, a citizen of the United States, residing at Columbia, in the county of Lancaster and State of Pennsylvania, have invented a new and useful Level, of which the following is a specification.

My invention relates to improvements in levels; and the objects of my improvements are, first, to arrange and provide for an accurate reading by means of indication-lines; second, to provide means for making the level more sensitive, and, third, to furnish a level of simple and novel construction. I attain these objects by means of the mechanism illustrated in the accompanying drawings, in which—

Figure 1:
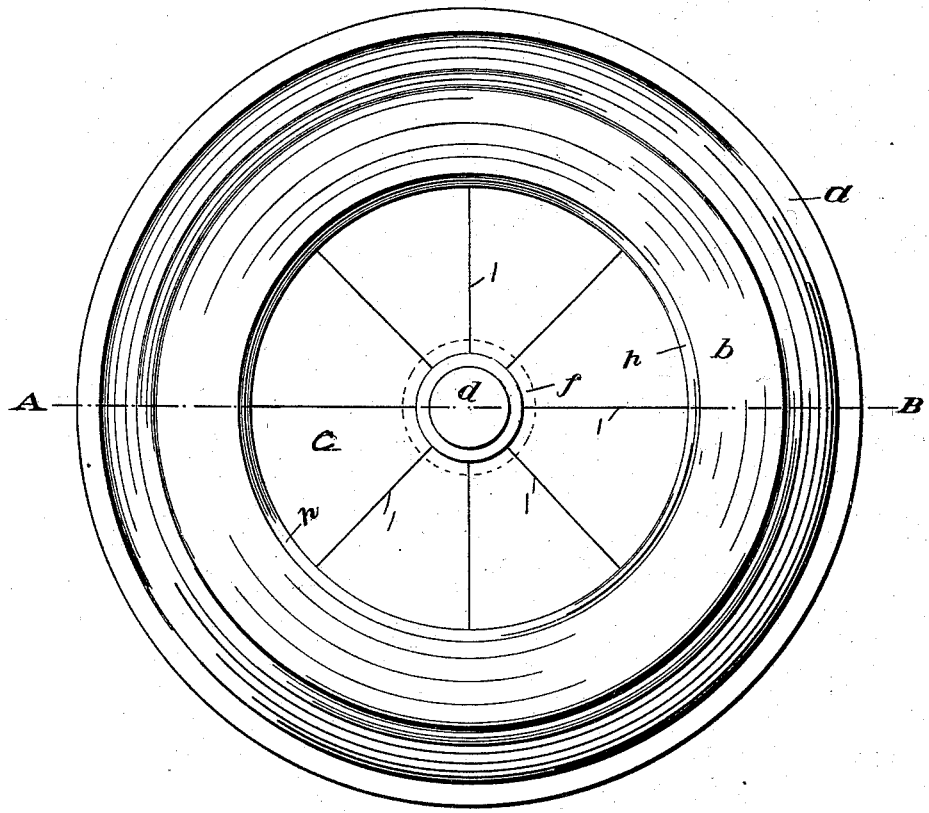
Figure 2:
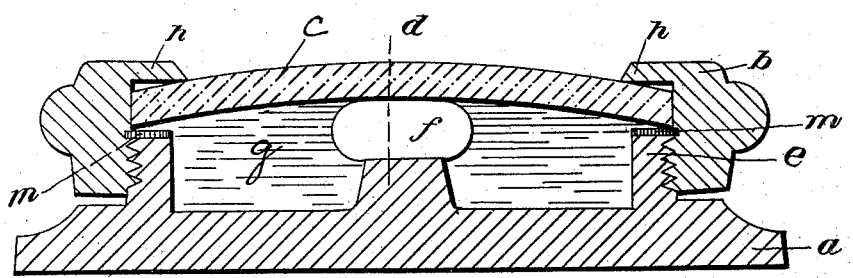

Figure 1 is a plan of the level complete. Fig. 2 is a cross-section of the level taken on the line A B. (See Fig. 1.)

Similar letters refer to similar parts in both views.

The level is composed of five distinct and separate parts—viz., the bottom or base $a$, the cap $b$, the lens $c$, the packing $m$, and the fluid $g$.

The base $a$ is in my preferred construction circular in form, having a perfectly flat bottom. An annular rib $e$ is formed on the upper surface of the base concentric to the center of the base. The rib $e$ is threaded to permit of the cap being screwed thereto. Both the outer screw side and the inner smooth side of the annular rib $e$ are substantially perpendicular to the bottom of the base. In the exact center of the top of the base a conical boss having a flat top extends upward, its longitudinal axis being perpendicular to the bottom of the base. The boss $d$ is of such height as to project part way into the air-bubble $f$. A ring $b$ has internal threads which engage with the threads on the base when screwed to place. A lip $h$ projects from the top of the ring inwardly and serves to hold the lens in position. The lens $c$ being held in place by the rim on lip $h$ all points on its bottom edge press firmly upon the rubber packing-ring $m$, preventing any escape of the fluid. The packing-ring $m$ is interposed between the bottom edge of the lens and the upper flat surface of the annular rib on the base. The top of the boss $d$ is perfectly plane, and its plane is parallel to the plane of the bottom of the base.

The essential feature of my improvement consists in the employment of the central boss and in making the boss of proper length. The boss should be of such length that its upper end will project into the air-bubble. The object of this is to change the form of the bubble when it is in the center of the level and also to increase the sensitiveness of the level. The object of having the bubble enlarge when in the center is that its central position will be more apparent and distinguishable from its other positions. When the level is tilted, the bubble moves clear from the boss and assumes a normal shape vertically thicker. Placing the level so it will be level the bubble comes to the center and spreads or flattens out, and this flattening out of its regular shape is what makes it sensitive, and in this form a very slight tilt will cause the bubble to move very quickly.

The air in the level can at no time escape. Therefore when it is pushed into position around the boss it must of necessity flatten and spread out, as the boss is immovable. In this position the size of the circle around the bubble's edge is larger and more air is in contact with the lens. The tendencies which cause the bubble to assume the shape it normally has make the bubble very sensitive when in the central position. When the level is tilted so much that the bubble is entirely free from the boss, the bubble is not so sensitive, owing to the fact that the bubble is in its normal shape, and the tendencies which keep it in that shape are not influenced by the presence of the central boss.

In order to enable the user to more readily level his work, I have provided indication-lines $l$, extending radially from the boss $d$. These lines I consider a very valuable feature of my invention, as without them it would be very difficult to define the exact direction of slope, and their use enables a single glance to suffice to indicate the direction of slope.

Having completely described my invention, what I claim, and desire to secure by Letters Patent, is—

In a spirit-level the combination with a base having a screw-threaded annular rim, and a central, upwardly-projecting boss having a flat top, of a radially-marked transparent cover connected to the annular rim by a water-tight joint, said boss being so arranged as to flatten the air-bubble at the center of the level.

ERNST G. SMITH.

Witnesses:
BRUNER KAUFFMAN,
ANDREW J. KAUFFMAN.